(12) United States Patent
Chaves et al.

(10) Patent No.: US 7,724,440 B2
(45) Date of Patent: May 25, 2010

(54) COMBINING OUTPUTS OF DIFFERENT LIGHT SOURCES

(75) Inventors: Julio C. Chaves, Madrid (ES); Waqidi Falicoff, Newport Beach, CA (US); Juan Carlos Miñano, Madrid (ES); Pablo Benítez, Madrid (ES); William A. Parkyn, Jr., Lomita, CA (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 0 days.

(21) Appl. No.: 11/891,192

(22) Filed: Aug. 8, 2007

(65) Prior Publication Data

US 2008/0074752 A1 Mar. 27, 2008

Related U.S. Application Data

(63) Continuation-in-part of application No. 11/115,055, filed on Apr. 25, 2005, now Pat. No. 7,286,296.

(60) Provisional application No. 60/822,207, filed on Aug. 11, 2006, provisional application No. 60/564,847, filed on Apr. 23, 2004, provisional application No. 60/612,558, filed on Sep. 22, 2004, provisional application No. 60/614,565, filed on Sep. 29, 2004, provisional application No. 60/658,713, filed on Mar. 3, 2005.

(51) Int. Cl.
G02B 27/10 (2006.01)
(52) U.S. Cl. .................. 359/628; 359/618; 359/629
(58) Field of Classification Search ................ 359/641, 359/618, 628–629
See application file for complete search history.

(56) References Cited

U.S. PATENT DOCUMENTS

| | | | | | |
|---|---|---|---|---|---|
| 5,146,248 | A | * | 9/1992 | Duwaer et al. | 353/122 |
| 5,392,080 | A | * | 2/1995 | Galt et al. | 353/84 |
| 5,434,754 | A | | 7/1995 | Li et al. | 362/31 |
| 5,700,078 | A | * | 12/1997 | Fohl et al. | 362/553 |
| 6,155,699 | A | * | 12/2000 | Miller et al. | 362/293 |
| 2004/0150997 | A1 | | 8/2004 | Ouderkirk et al. | 362/255 |
| 2005/0243570 | A1 | * | 11/2005 | Chaves et al. | 362/551 |
| 2005/0270775 | A1 | * | 12/2005 | Harbers et al. | 362/231 |
| 2006/0164607 | A1 | * | 7/2006 | Morejon et al. | 353/94 |

FOREIGN PATENT DOCUMENTS

| | | |
|---|---|---|
| EP | 1 160 883 A2 | 5/2001 |
| GB | 2 365 962 A | 7/2001 |
| WO | 00/60396 | 10/2000 |
| WO | 01/40702 | 11/2000 |
| WO | 2004/021461 A2 | 8/2003 |

* cited by examiner

*Primary Examiner*—Joseph Martinez
*Assistant Examiner*—James R Greece
(74) *Attorney, Agent, or Firm*—Drinker Biddle & Reath LLP

(57) ABSTRACT

An embodiment of an optical manifold has first and second collimators, each arranged to receive light from a source and transmit the light to an exit port of the collimator, and a separator arranged to emit some of the light from the exit ports of the first and second collimators and to recycle some of the light into the collimators. Another embodiment has at least three collimators of substantially equal length and having central axes, respective light sources at entry ports of the collimators, the collimators being arranged with their central axes parallel and with their light sources in a common plane and reflectors positioned to direct light from exit ports of the collimators to a selectively reflective component that guides all the light into a common exit beam.

14 Claims, 14 Drawing Sheets

COMBINING OUTPUTS OF DIFFERENT LIGHT SOURCES

CROSS-REFERENCE TO RELATED APPLICATIONS

This application claims benefit of U.S. Provisional Patent Application No. 60/822,207, filed Aug. 11, 2006, which is incorporated herein by reference in its entirety.

This application is a continuation in part of U.S. patent application Ser. No. 11/115,055, filed Apr. 25, 2005, (publication no. US 2005/0243570 A1) which is incorporated herein by reference in its entirety.

Application Ser. No. 11/115,055 claims the benefit of U.S. Provisional Patent Application No. 60/658,713, filed Mar. 3, 2005, entitled OPTICAL MANIFOLDS FOR LIGHT-EMITTING DIODES, which is incorporated by reference herein in its entirety.

Application Ser. No. 11/115,055 claims the benefit of U.S. Provisional Patent Application No. 60/614,565, filed Sep. 29, 2004, entitled OPTICAL MANIFOLDS FOR LIGHT-EMITTING DIODES, which is incorporated by reference herein in its entirety.

Application Ser. No. 11/115,055 claims the benefit of U.S. Provisional Patent Application No. 60/612,558, filed Sep. 22, 2004, entitled OPTICAL MANIFOLDS FOR LIGHT-EMITTING DIODES, which is incorporated by reference herein in its entirety.

Application Ser. No. 11/115,055 claims the benefit of U.S. Provisional Patent Application No. 60/564,847, filed Apr. 23, 2004, entitled OPTICAL MANIFOLDS FOR LIGHT-EMITTING DIODES, which is incorporated by reference herein in its entirety.

FIELD OF THE INVENTION

The present invention relates generally to blending light from different sources in desired proportions, and in one aspect to a device for providing collimated light with a flux that is a non-integer multiple of the output of a source element such as an LED, while mitigating the disadvantages of using multiple source elements. Light-emitting diodes (LEDs), and more particularly to light collection/distribution systems that mix the light output from multiple light-emitting diodes (LEDs) (and, optionally, phosphors as well) of several different wavelengths for étendue-limited applications such as high-luminance, high-luminosity displays. High luminance is always of paramount value, and etendue-limited displays deliver luminance nearly as high as that of the LEDs themselves, with high efficiency (>80%) as well.

Although embodiments of the invention are described that blend visible light of different colors, and especially red, green, and blue light, the invention in its broadest sense is not limited to those colors, or to visible light.

DESCRIPTION OF RELATED ART

An important problem that needs to be addressed is how to combine the output from multiple LEDs sources to produce a high-flux, high-luminance source, wherein the "combined source" has a smaller etendue than the combined values of the individual LED sources. Ideally, the combined source would have an etendue no larger than the largest LED in the system, and the system would operate without a substantial loss of flux. In US published Patent Application No. 2005/0243570 A1 titled "OPTICAL MANIFOLD FOR LIGHT-EMITTING DIODES" of Chaves et al, filed Apr. 25, 2005 (commonly assigned and having overlapping inventorship with the present application), the disclosure of which is incorporated herein by reference in its entirety, there are several embodiments that show how this may be achieved. For example, FIG. 48 of the above-referenced '570 application is repeated here as FIG. 1, wherein optical manifold 1 combines the light from red LED 2, green LED 3, and blue LED 4, respectively using crossed-CPC collimators 5, 6, and 7, with internal collimator beamwidth θ. Prisms 8 and 9 deflect light fro two of the collimators 5 and 7 into prism 10, in which are mounted crossed dichroic mirrors (filters) 11 and 12. The third collimator 6 feeds directly into the prism 10. The three colors combine into an output beam 13, with beamwidth α=arcsin (n sin θ), where n is the refractive index of the material of the collimators. In this embodiment the exit aperture of the device has an etendue (in a theoretically perfect implementation) that is equal to the etendue of one of the LEDs (which are all of the top emitting type).

This embodiment, however, as well as others in that application, has limitations. First, the device in FIG. 1 can only mix one green, one blue and one red LED at a time if the etendue limitation described above is to hold, that is, if the etendue of the output aperture is to be the same as one of the LEDs. Other embodiments in the '570 application show how the configuration of FIG. 1 can be generalized to multiple LEDs, but to conserve etendue the numbers of LEDs of each color are equal. It would be desirable to have a device that could mix different numbers of light sources of different sorts and still hold this etendue constraint. For example, it would be desirable to mix light from different numbers of LEDs of different colors, such as more than one green LED in combination with each red LED and blue LED. One reason why this is desirable is that a single green LED typically has insufficient luminosity relative to a red or blue LED of the same area and type for the RGB triad to achieve white light. Typically two green LEDs are used for every one red and one blue LED in order to get a balanced white from their suitably adjusted admixture. That is done because currently available green LEDs are less efficient than currently available red and blue LEDs, even though the green light itself has maximum luminous efficacy. Incorporating two green LEDs doubles the required etendue of the system. The actual ratio required is only 1.5, but for practical reasons a whole number of LEDs of each color is necessary, and LEDs of matched size and current consumption are desirable.

Also in the embodiment shown in FIG. 1 the optical path lengths for the different color LEDs are not equal. In FIG. 1, the optical path length of the light exiting the device from LED 3 is shorter than the path length from LEDs 2 & 4, on either side of LED 3. This can cause a problem for those applications where etendue matching of components is critical.

The present specification discloses several novel embodiments that combine multiple LEDs of the same color such that the etendue of the combined source is substantially the same as the étendue of just one of the LEDs. This is accomplished with a reduction in system efficiency that is sufficiently slight to be acceptable for many applications. Finally, an embodiment is disclosed that achieves this constraint on étendue and also provides near equality of the average optical path lengths of the LED colors, which makes possible a further improvement in far-field color mixing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the present invention, example of which is illustrated in the accompanying drawings, in which like numbers represent the same or similar elements.

Figure 2:
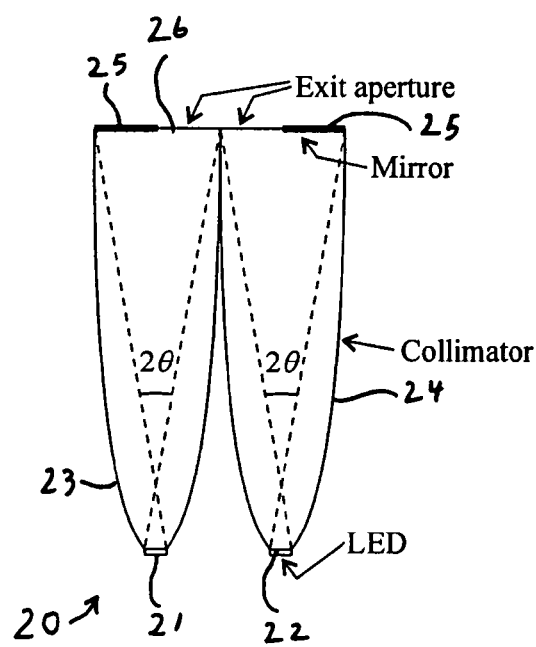
FIG. 2 is a cross-sectional view of a first embodiment of a device for combining light from two sources with controlled intensity and étendue.

FIG. 2 shows a device, indicated generally by the reference numeral 20, that combines the output of two LEDs 21, 22 of the same or different colors. In the case where the colors are different there will be spatial separation of colors. This may or may not be an issue depending on the application. On each of the LEDs (in this case one on the left and one on the right) there is a collimator 23, 24. At the top of each collimator there is a mirror 25 that covers a fraction of the exit aperture 26 of the collimator 23, 24. As shown in FIG. 2, each collimator 23, 24 is a compound parabolic concentrator, with its intensity distribution being nearly invariant across its aperture, so that etendue is in direct proportion to the exposed proportion of the exit aperture area. In the case of FIG. 2 each mirror 25 covers approximately half the light output area from the respective collimator 23, 24. The device 20 is not limited to this fraction. However, the output étendue of the collimator 23, 24 is dependent on the effective area of the exit aperture. A pair of collimators 23, 24 as shown in FIG. 2, each with half of its exit aperture 26 uncovered, has the same étendue as a single similar collimator with its exit aperture fully exposed.

As shown in FIG. 2, the reflector cover 25 is specular so as to recycle the light back toward the LED 21, 22 such that there are minimal losses between the mirror and the LED. A highly efficient collimator/concentrator, such as those described in our above-referenced earlier '570 application, is required to achieve high transfer efficiency in both directions. Such collimators are known to those skilled in the art of nonimaging optics. Examples include solid dielectric and open CPCs and variable index of refraction collimators. Cross-CPCs have been used in the past for coupling to square LEDs and work well in one direction only. However, when the optic is used in a recycling mode the light output from a cross-CPC collimator can produce a beam pattern where some of the flux is outside the acceptance angle of the optic as a concentrator, and is lost. A round CPC can be constructed that does not exhibit this loss. Therefore, collimator/concentrator devices other than cross CPCs are used if a high recycling efficiency is required.

In the case where both LEDs 21, 22 are the same color and the mirrors 25 cover half the exit apertures 26, the amount of flux that escapes from the exit aperture on the first pass is equal to the flux from a single identical collimator with one LED and with a fully uncovered exit aperture. If it is assumed for simplicity that the collimators have 100% transfer efficiency, the theoretical maximum output flux is equal to the flux of one LED, although in practice that is a few percent more than the best performing collimators known at this time. Recycling of light reflected off the mirrors 25 increases the output above that corresponding to one LED. The higher the transfer efficiency of the collimator/concentrator optic, and the higher the reflectance of the LED, the greater the total output flux. Currently commercially available LEDs typically have an effective reflectance of around 70%, which (ignoring losses at the mirror 25) allows a boost in flux to about 1.5 times that emitted on the first pass. The device shown in FIG. 2, with the two exit ports 50% covered, can thus emit a total flux about 1.5 times that emitted by a single collimator with a single LED and a fully uncovered exit port 26. (This is less than 1.5 times the original output of the LED, because of actual losses in the material of the optic 23, 24 and at the mirror 25.)

In addition, several LED architectures, such as the top emitting devices made by OSRAM Opto Semiconductors of Germany, have a top surface that is etched. This surface will scatter light striking in the reverse direction as well as in the forward direction. This can help to increase the chances of recycled rays escaping through the exit aperture on the next pass, thus increasing the total flux output. Raytrace simulations carried out by the inventors indicate that it is currently possible using existing commercially available LEDs, together with the highest performing collimators, to achieve a flux output that is between 1.3 and 1.5 times the output of the single LED in the configuration of FIG. 2. This increase is for many applications all that is needed to match the output of green LEDs with blue and red LEDs to produce white light.

The output can be reduced, without affecting the beam size or étendue, by reducing the reflectance of the mirrors 25 or of the LEDs 21, 22. The output can be increased, at the expense of an increase in étendue, by reducing the area of the exit apertures 26 covered by the mirrors 25.

Figure 1:
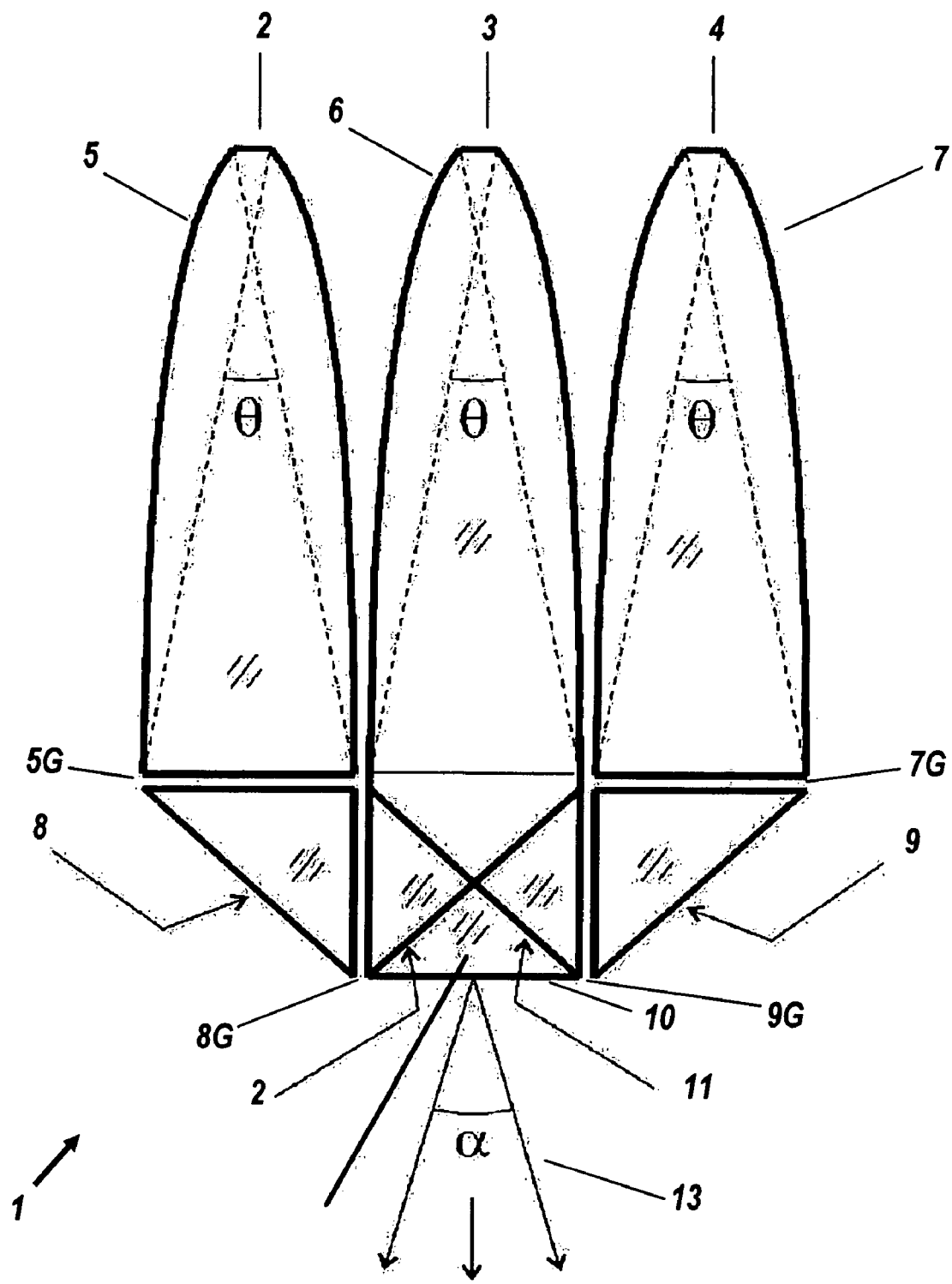
FIG. 1 is a cross-sectional view of a previously proposed three-color combining optical manifold.
Figure 3:
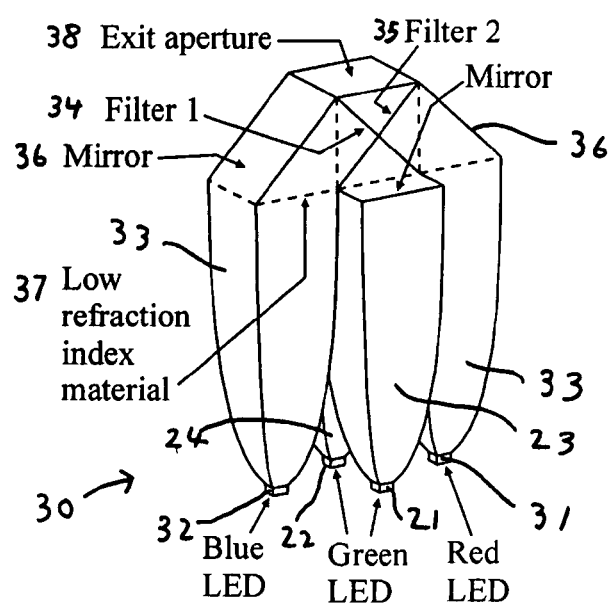
FIG. 3 is a perspective view of a first embodiment of an optical manifold, for combining light from four LEDs of three colors, incorporating the device of FIG. 2.

FIG. 3 shows how the device of FIG. 2 can be combined with the optical manifold of FIG. 1. FIG. 3 shows an optical manifold 30 comprising four LEDs, two green LEDs 21, 22, one red LED 31, and one blue LED 32. The collimators 33 for the red and blue LEDs direct the light from the LEDs to 45 degree prism mirrors 36 after traveling through a low index material 37 or air gap (represented by dotted lines), corresponding to the air gaps 5G, 7G, 8G, 9G in FIG. 1. The 45 degree oriented mirrors 36 redirect the red and blue light to a cross-dichroic filter assembly 34, 35. One of the two dichroic filters 35 lets through red and green, and reflects blue light to an exit aperture 38, while the second dichroic filter 34 lets through blue and green, and reflects red light to the exit aperture 38. The part of the light from the two green LEDs that is not recycled by the mirrors 25 is transmitted through the cross-dielectric filter 34, 35 and exits out the top of the device at the exit aperture 38, mixed with the reflected red and blue light. It is desirable for most practical applications that the output beams for all three colors have nearly the same beam spread and be spatially the same size at the exit aperture. This is difficult to achieve in this embodiment, since the optical path length of the green light, after escaping its dual collimator exit aperture, is shorter than the path lengths of the light from the red and blue sources (which in this case have equal path lengths) emitting from their collimators. The recycling path length in the dual collimator for the green sources is not an issue, as only the distance from the aperture exit of this optic need be considered. A cubical light pipe between the exit port 26 of the green collimators 23, 24 and the cross-dichroic filter assembly 34, 35 would equalize the path lengths, but would result in the four LEDs no longer being co-planar. In practical configurations, it is usually desirable to have the LEDs in a single plane, as shown in FIG. 3, so that they can be mounted on a single circuit board.

Figure 4:
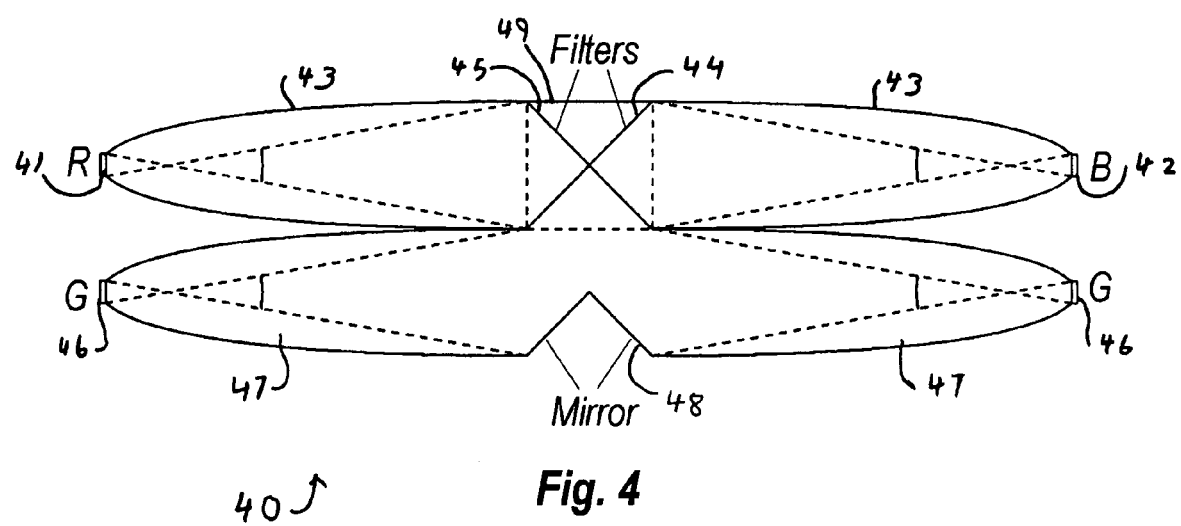
FIG. 4 is a cross-sectional view of a second embodiment of an optical manifold, for combining light from four LEDs of three colors.

Referring to FIG. 4, in an alternative approach 40 the 45 degree prisms are not required. Also, in the optical manifold 40 a red LED 41 and a blue LED 42 are connected to collimators 43 that face each other on opposite sides of a cross-dichroic filter assembly 44, 45. Two green LEDs 46 are connected to collimators 47 that face each other on opposite sides of a V-shaped mirror 48 that redirects part of the light from the green LEDs 46 to the filters 44, 45. The filters operate the same as in the embodiment of FIG. 3. In the manifold shown in FIG. 4, the part of the light from each green LED 46 that does not fall on the V-shaped mirror 48 enters the collimator 43 of the other green LED 46, and is recycled. The only difference in recycling efficiency compared with FIG. 3 is that resulting from losses at the mirror 48 instead of the mirrors 25. The non-uniformity in light distribution is opposite in FIGS. 3 and 4, because in FIG. 4 it is the green light that has the longer path length from the exit port of its individual collimator to the exit port 49 of the manifold 40.

It is possible to replace the lower green section 46, 47, 48 of the manifold 40 of FIG. 4 with the device 20 shown in FIG. 2. That would make the average optical path lengths for the three colors the same. However, in that modified embodiment the LEDs reside on three different planes, rather than a single plane, as in FIG. 3, or two parallel planes, as in FIG. 4, and the overall configuration of the manifold is less compact than either FIG. 2 or FIG. 4. Those factors are disadvantages for some practical applications.

Figure 5:
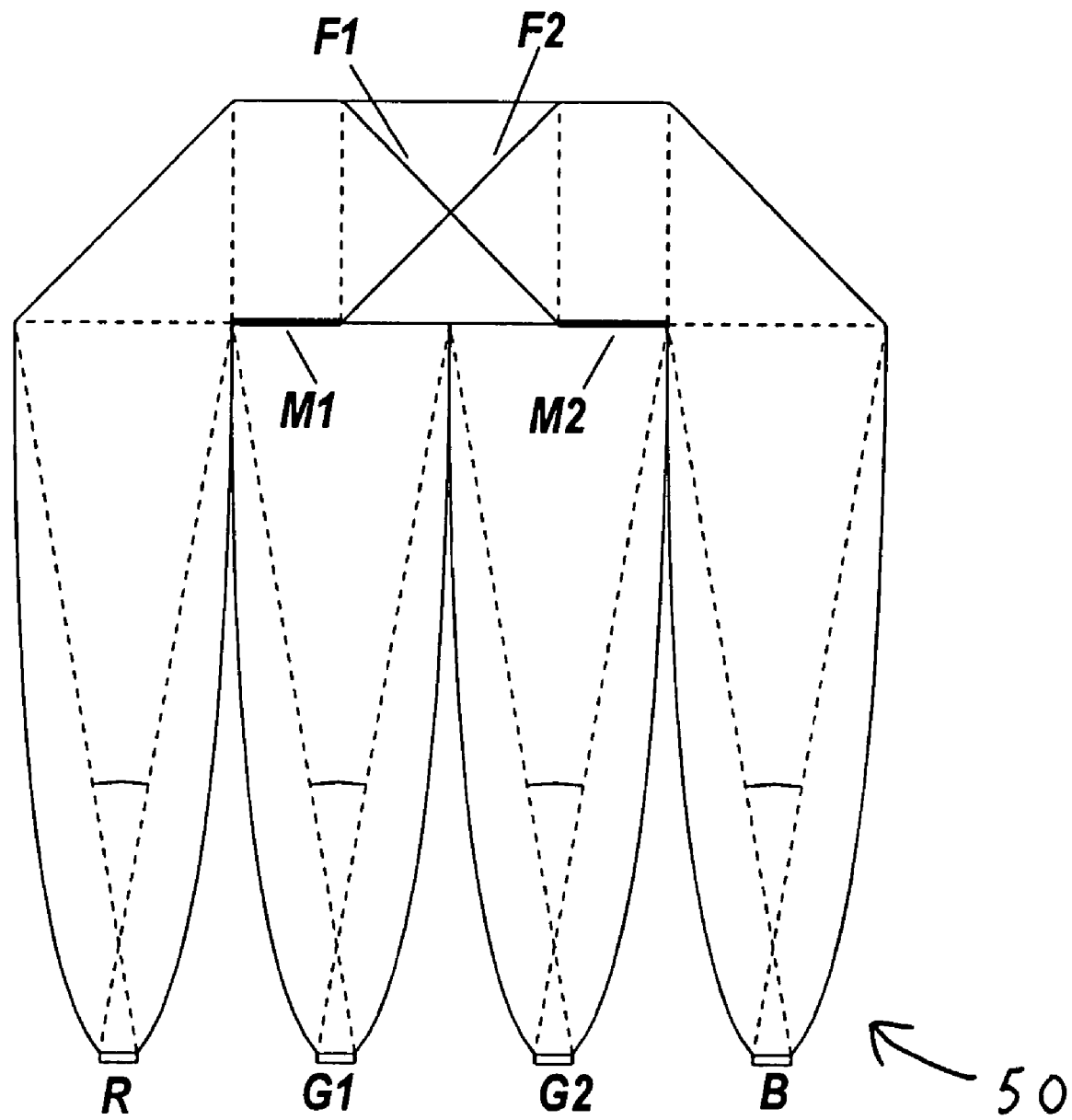
FIG. 5 is a cross-sectional view of a third embodiment of an optical manifold, for combining light from four LEDs of three colors.

FIG. 5 shows still another example of an optical manifold 50 that uses the device of FIG. 2. In this case red LED R, blue LED B, and two green LEDs G1 & G2 are on one line and in the same plane, but the average optical path length for green is shorter than the path length for red & blue by an even greater amount than in FIG. 3. Mirrors M1 & M2 recycle some of the green light to enhance green luminance.

Figure 6A:
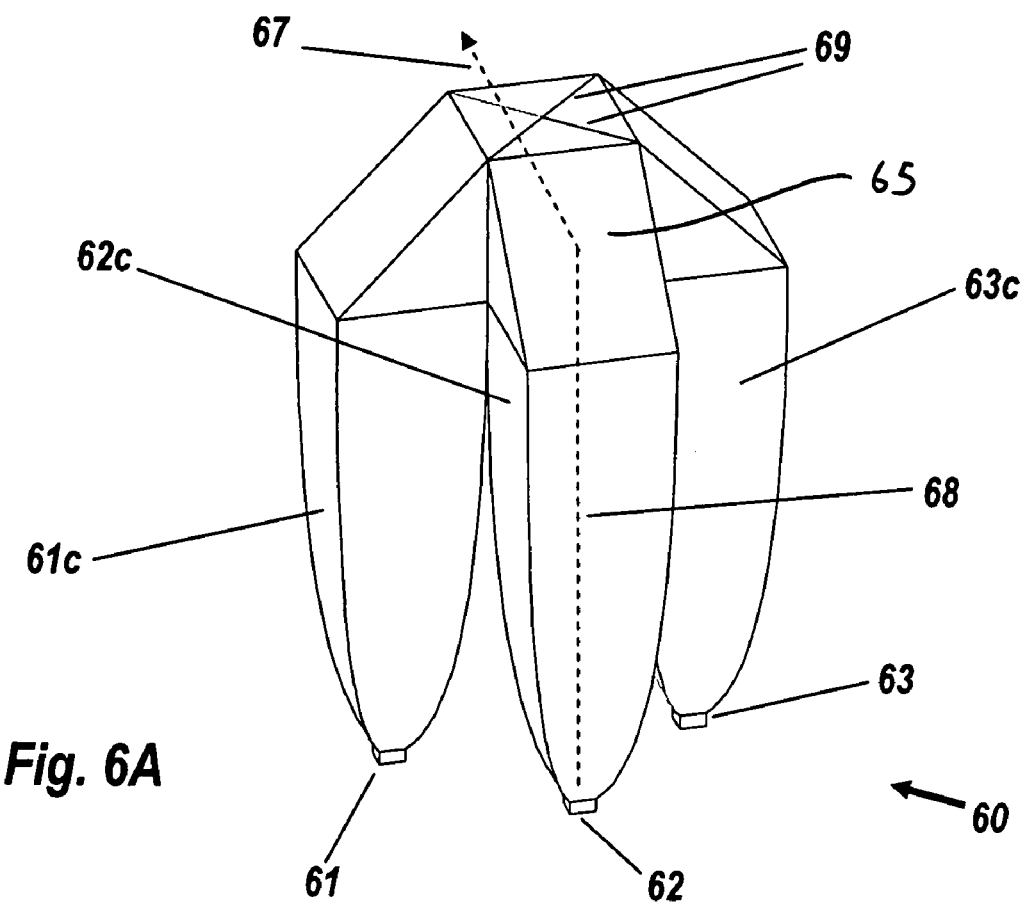
FIG. 6A is a perspective view of a fourth embodiment of an optical manifold, for combining light from LEDs of three colors.
Figure 6B:
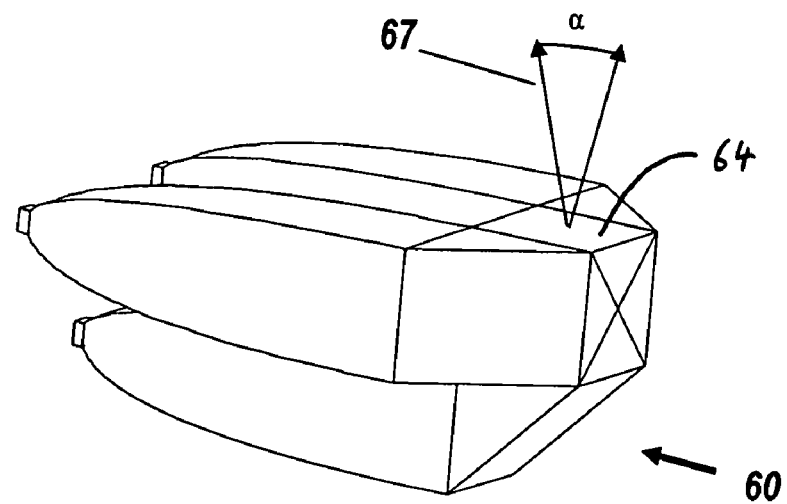
FIG. 6B is a different perspective view of the optical manifold shown in FIG. 6A.

FIGS. 6A and 6B are perspective views of a further form of optical manifold 60 that has the same average optical path length for three LEDs and has the three LEDs positioned on the same plane. The optical manifold 60 combines the output of LEDs 61, 62, & 63 of differing dominant wavelengths, as collimated by square collimators 61c, 62c, & 63c (shown as cross-CPCs) respectively, such that rays 67 emerge from an exit port 64 of the optical manifold 60 at approximately 90 degrees to the parallel optical axes of the collimators. This is illustrated by dotted arrow 68 in FIG. 6A which shows a central ray (on the optical axis of the collimator 62c) from the middle LED 62 first striking a 45-degree mirror 65, which redirects the ray through a pair of crossed dichroic mirrors/filters 69 to the exit aperture 64 on the side of the device. FIG. 6B shows a different perspective view of the device (in a horizontal position), showing output beam 67 with angular spread $\alpha$. The crossed dichroic filters 69 are configured so that light from the other LEDs 61 and 63 is reflected into the same direction as the light from the middle LED 62. For example, if the LED 61 is a blue LED, the LED 62 is a green LED, and the LED 63 is a red LED, then the dichroic mirrors 69 can have the same spectral properties as the dichroic mirrors 34, 35 shown in FIG. 3.

Figure 7A:
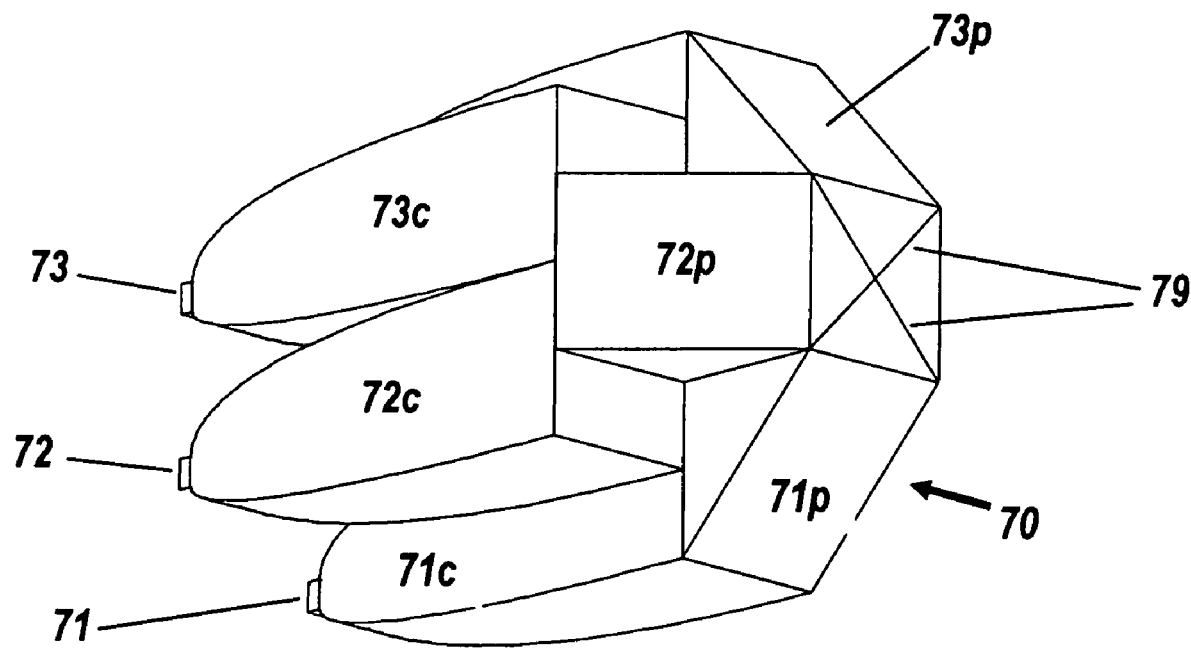
FIG. 7A is a perspective view similar to FIG. 6A of a fifth embodiment of an optical manifold, incorporating features of the optical manifolds shown in FIGS. 5 and 6A.
Figure 7B:
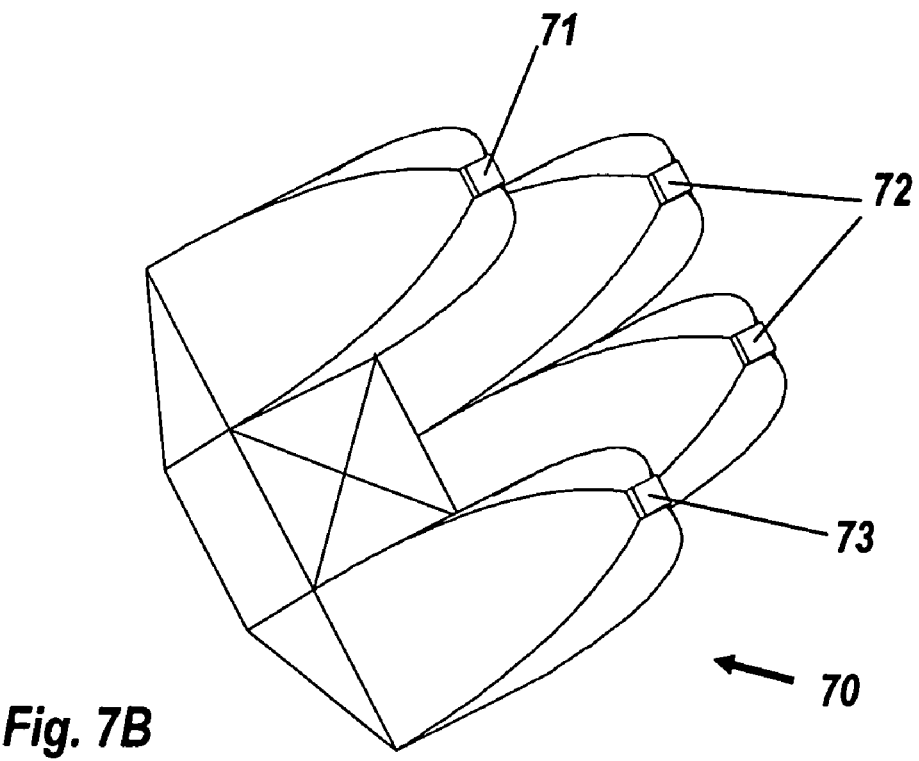
FIG. 7B is a different perspective view of the optical manifold shown in FIG. 7A.
Figure 7C:
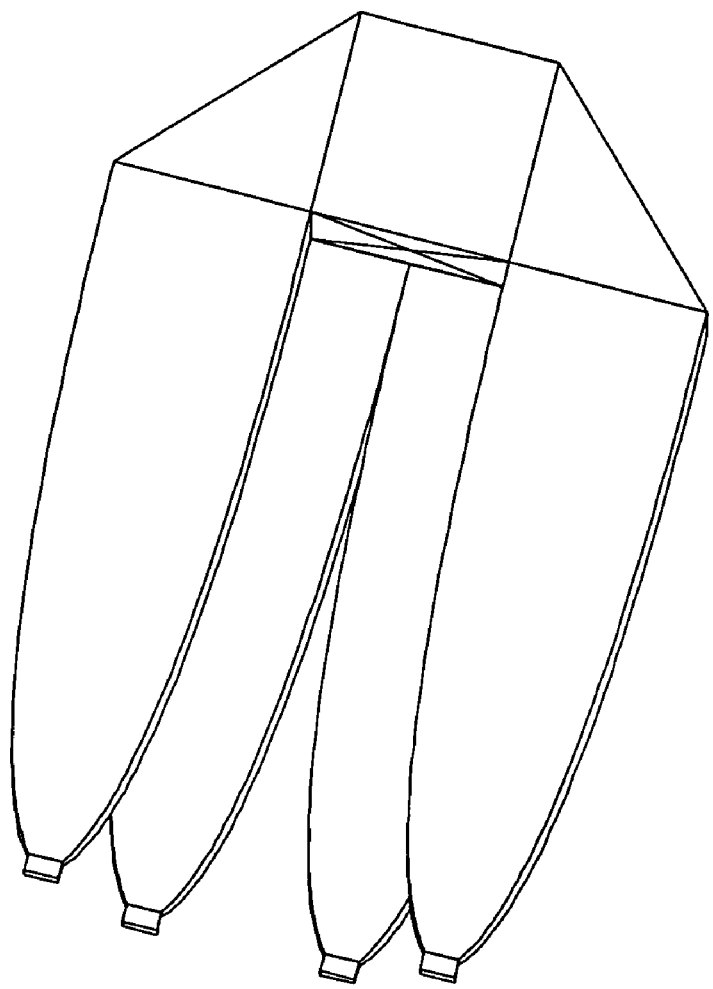
FIG. 7C is a different perspective view of the optical manifold shown in FIG. 7A.
Figure 7D:
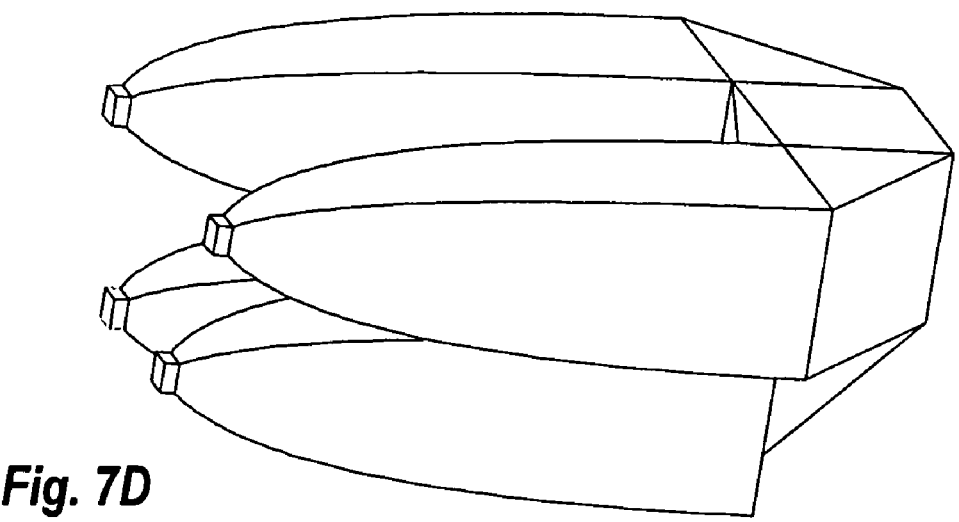
FIG. 7D is a different perspective view of the optical manifold shown in FIG. 7A.

If higher green output is required then the device 20 of FIG. 2 can be combined with the optical manifold 60 of FIGS. 6A and B. Referring to FIGS. 7A, B, C, and D, an optical manifold 70 comprises a red LED 71, two green LEDs 72, and a blue LED 73, each with respective square collimators 71c, 72c, & 73c (shown as cross-CPCs). Mirror prisms 71p, 72p, and 73p, similar to those shown in FIG. 6, send the light into crossed dichroic mirrors 79.

Figure 8A:
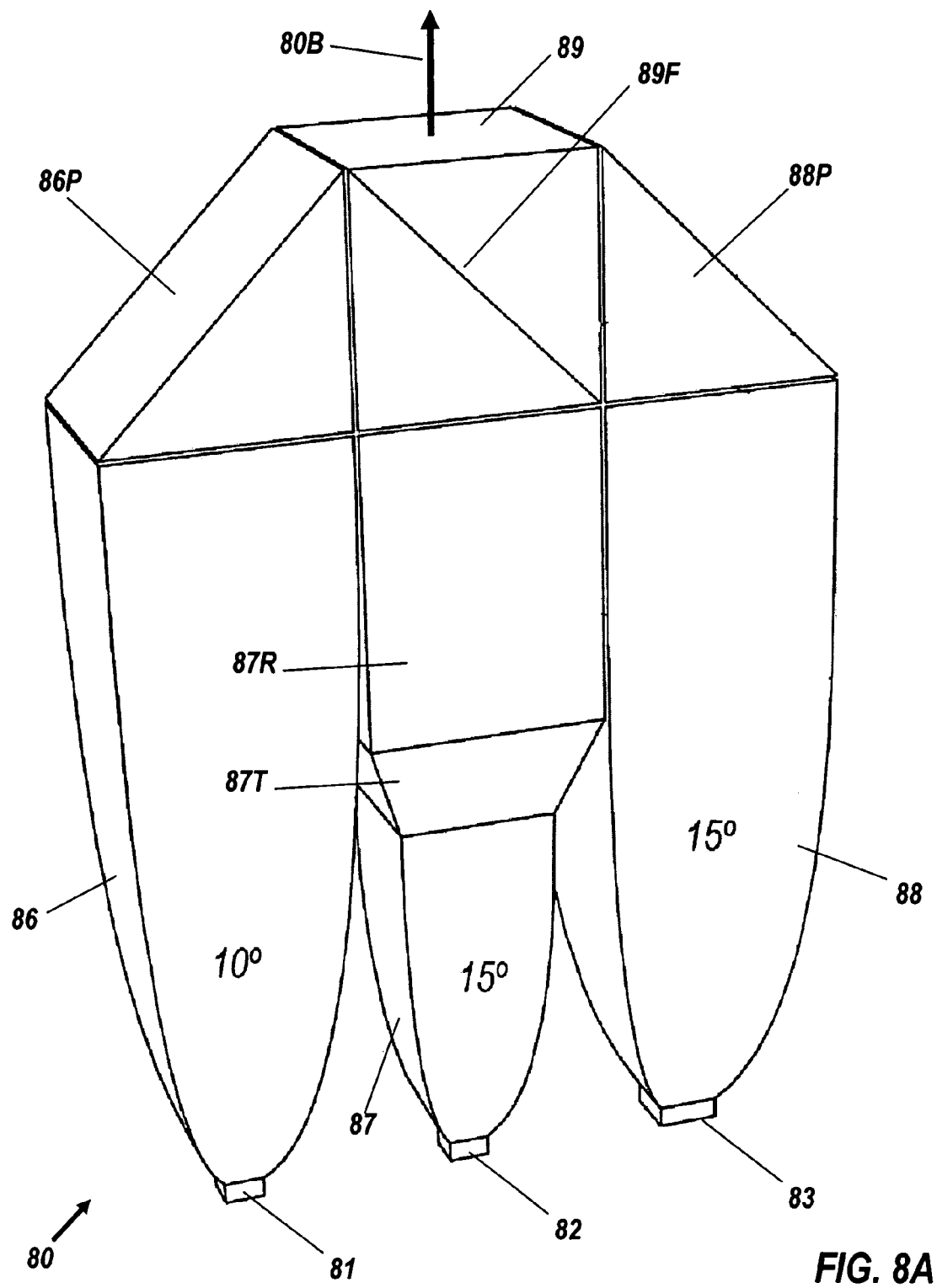
FIG. 8A is a perspective view of a sixth embodiment of an optical manifold.

Another approach to increasing the luminance or efficacy of the green LEDs is to replace the green LED with a combination of a blue LED with a green phosphor. In this approach there are two blue LEDs, one red LED, and a transparent slab of green phosphor is remotely illuminated by one of the blue LEDs. FIG. 8A is modified from FIG. 76 of United States published Patent Application No. 2006/0239006 A1 "OPTICAL MANIFOLD FOR LIGHT-EMITTING DIODES" of Chaves et al., filed Jan. 11, 2006 (which is a continuation-in-part of the aforementioned US Patent Application No. 2005/0243570 A1).

FIG. 76 of the '006 application showed a blue LED which was used to activate a phosphor patch. The original system of FIG. 76 operated as follows. A central blue LED as collimated by a collimator was transmitted through a short pass filter and exited through an aperture as seen by a ray bundle. Longer wavelength light which was emitted by the phosphor patch with white reflective cover was redirected back to the short-pass filter by an optical train comprising a collimator and a 45 degree turning mirror, whereupon it was reflected by the short pass filter and exited the device through the aperture. It is possible to adapt this device to make an RGB device and the general principles described herein can be used with several of the other embodiments in the aforementioned patent applications of Chaves at el.

Figure 8B:
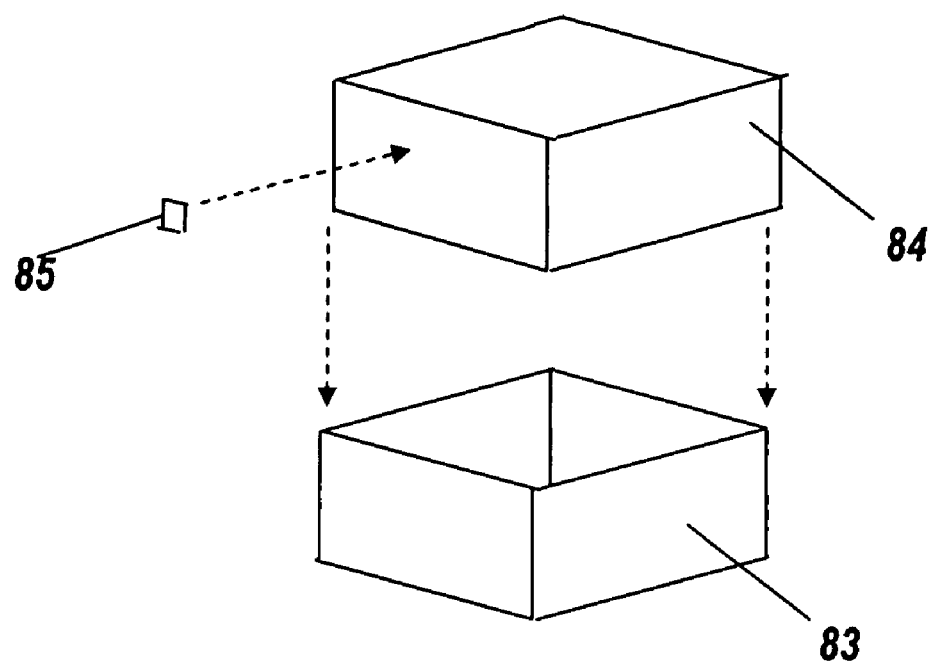
FIG. 8B is an exploded perspective view of a light source.

Referring now to FIGS. 8A and 8B, an optical manifold 80 comprises a short-wavelength blue LED 81, a longer-wavelength blue LED 82, a phosphor box 83, a 10° CPC collimator 86 for the LED 81, topped with a right angle prism 86P, a 15° CPC collimator 87 for the LED 82, topped with a trapezoidal prism 87T and a light-transmitting rod 87R, a 15° CPC collimator 88 for the phosphor box 83, topped with a right-angle prism 88P, and a prism block 89 comprising a blue-pass filter 89F. A white output beam 80B comprises collimated light from the longer-wavelength blue LED 82 and light from the phosphor box 83. This arrangement has three benefits. First, all the photostimulative blue light from the short-wavelength blue LED 81 is used by the phosphor 83 for conversion into more luminous wavelengths. Second, the additional blue LED 82 emits at a longer wavelength that is visually more luminous. Third, the current of LED 82 can be varied relative to that of LED 81 in order to control the color temperature of the white output.

FIG. 8B is an exploded close-up view of the open-topped highly reflective phosphor box 83, showing how the transparent green phosphor 84 such as transparent YAG, one preferably with a spectrum similar to a green LED, fits within it, and a red LED 85 is bonded thereto so as to be within the phosphor box 83. A red LED is more efficient at making red light than is a conventional yellow phosphor, and a green phosphor is more efficient than is a green LED. The red LED is located below or on the sides of the transparent phosphor patch. The red LED 85 can be smaller than the phosphor patch 84, because the efficacy of red LEDs is currently much higher than green LEDs. By choosing a material for the phosphor patch 84 that is transparent in the red wavelengths, the light from the red LED 85 will transmit through the patch and be sent via the optical train to the short pass filter 89F, by which the red light is reflected to exit the device through the exit port 89 as part of the ray bundle 80B. The reflective box 83 surrounding the phosphor patch 84 and the red LED 85 is chosen to be diffusely reflective so that as much as possible the red light exiting the top surface of the phosphor patch illuminates the whole top surface of the phosphor patch. To reduce absorption losses, the package of the red LED is chosen to be small, and the surfaces in contact with the transparent phosphor 84 are chosen to be highly reflective.

Figure 9A:
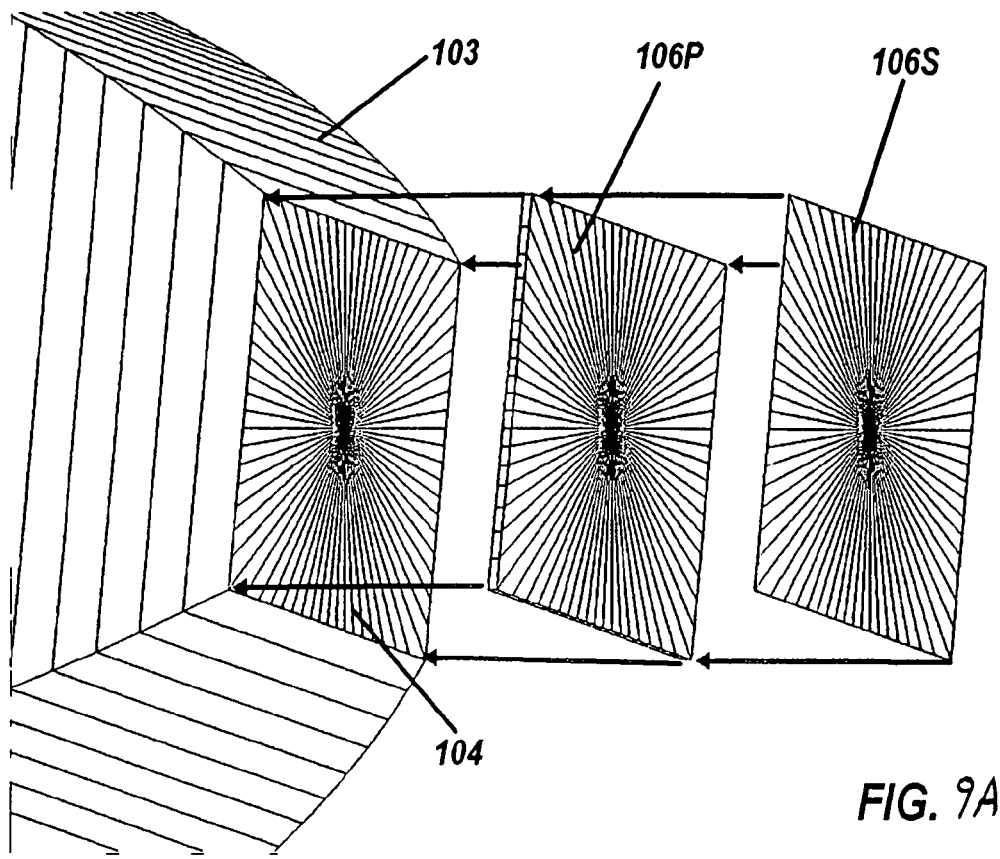
FIG. 9A is an exploded perspective view of a red semiconductor installed atop a green phosphor in an optical manifold.

It is believed possible to utilize a photoluminescent semiconductor, such as a slice from a wafer of AlInGaP, to generate red light when illuminated by blue light. Since this material is transparent, it can be overlaid over a green phosphor and the combination can be used instead of a yellow phosphor. Using a green phosphor can be advantageous when the quantum efficiency of the semiconductor is more than that of the yellow phosphor. FIG. 9A shows an example of such a configuration, showing a large cross parabolic concentrator (CPC) 103 with an exit face 104. A green phosphor 106P bonds thereupon and a thinner red semiconductor layer 106S is installed atop the green phosphor. By selecting the thickness of the layers 106P, 106S, and thus the proportion of blue light that is converted to green and red light, a light source with a desired color balance can be constructed.

Figure 9B:
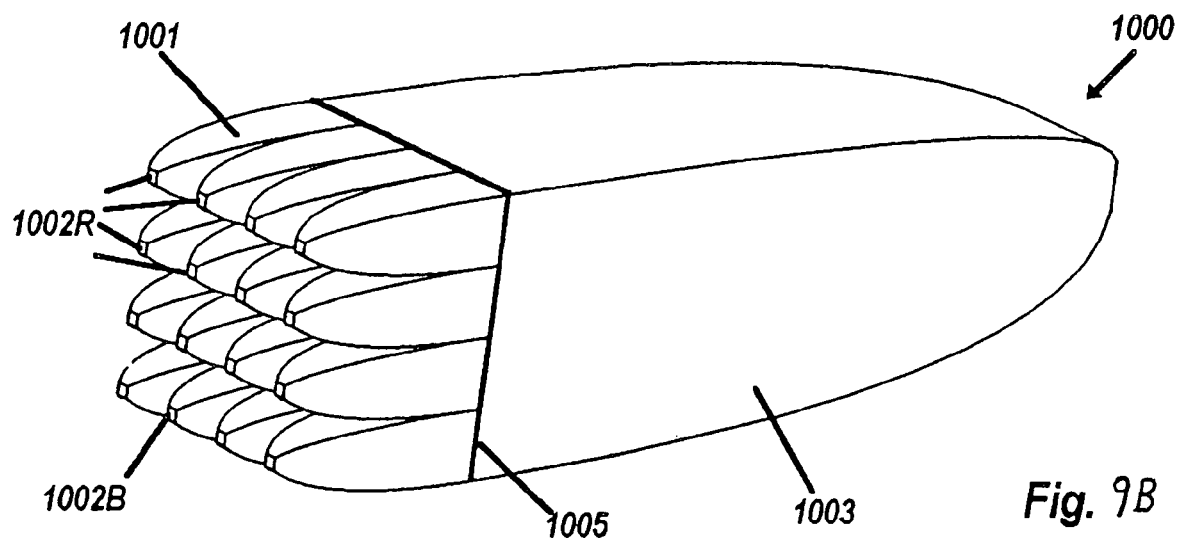
FIG. 9B shows a manifold fed by both red and blue LEDs, also including a phosphor-coated surface.
Figure 9C:
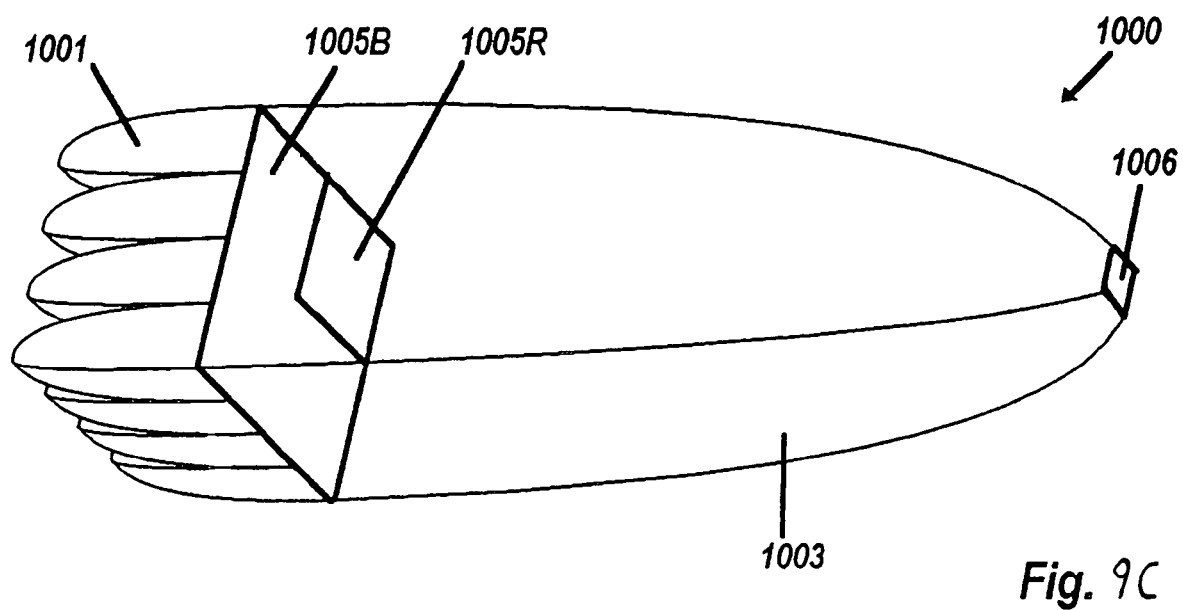
FIG. 9C is another view of the phosphor end of a manifold fed by both red and blue LEDs.

Another way to use a green phosphor is with red LED light sources, as discussed with reference to FIG. 8B above. FIG. 9B is a perspective view of a manifold 1000 comprising sixteen small CPCs 1001 feeding large a CPC 1003 through a planar filter 1005. In this example, four of the LEDs 1002R are red and the remaining twelve LEDs 1002B are blue. FIG. 9C is another view of the manifold 1000, showing a green phosphor 1006 at the exit plane of the large CPC 1003. The planar filter 1005 is shown in FIG. 9C as comprising a smaller red-pass filter 1005R and an L-shaped blue-pass filter 1005B. The filter 1005R lies over the four red LEDs 1002R, while filter 1005B lies over the twelve blue LEDs 1002B. This composite filter has recycling action for green light emitted back into the concentrator 1003 from the phosphor 1006.

Figure 10:
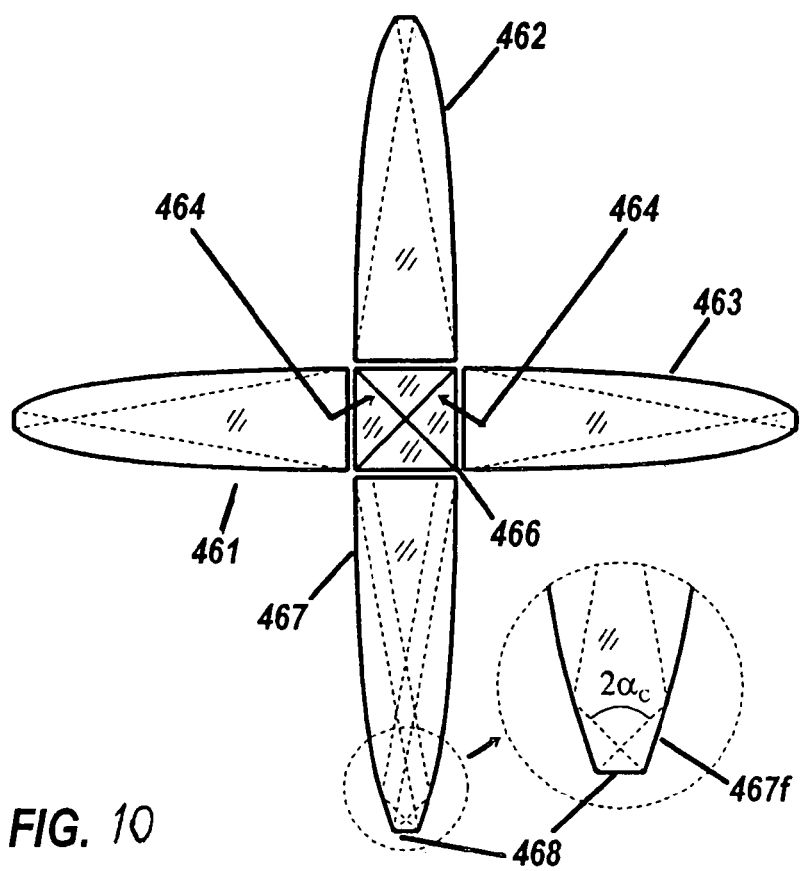
FIG. 10 is a cross-sectional view of an alternate configuration that includes a orthogonal combiner to provide a multiwavelength output, but with a four-prism filter arrangement.

FIG. 10 is a cross-sectional view of an alternative configuration of an optical manifold that can be used to combine a plurality of different color LEDS to provide a multiwavelength light output. FIG. 10 shows a red dielectric CPC 461, a green CPC 462, and a blue CPC 463. A first diagonal filter 464 reflects only red light, and a second diagonal filter 464 reflects only blue light. A prism block 466 is assembled from four smaller prisms having these filter coatings upon them. A fourth dielectric CPC 467 receives three superimposed radiant inputs and combines them into a single white output at exit face 468, whose edge is n times the size of one of edges of the three colored CPCs. A straight section 467f restricts incident rays to critical angle $\alpha_c$. The optical path lengths from all of the CPCs 461, 462, 463 to the exit 468 are substantially equal, which assists in achieving an output beam of uniform color in the far field.

Figure 11:
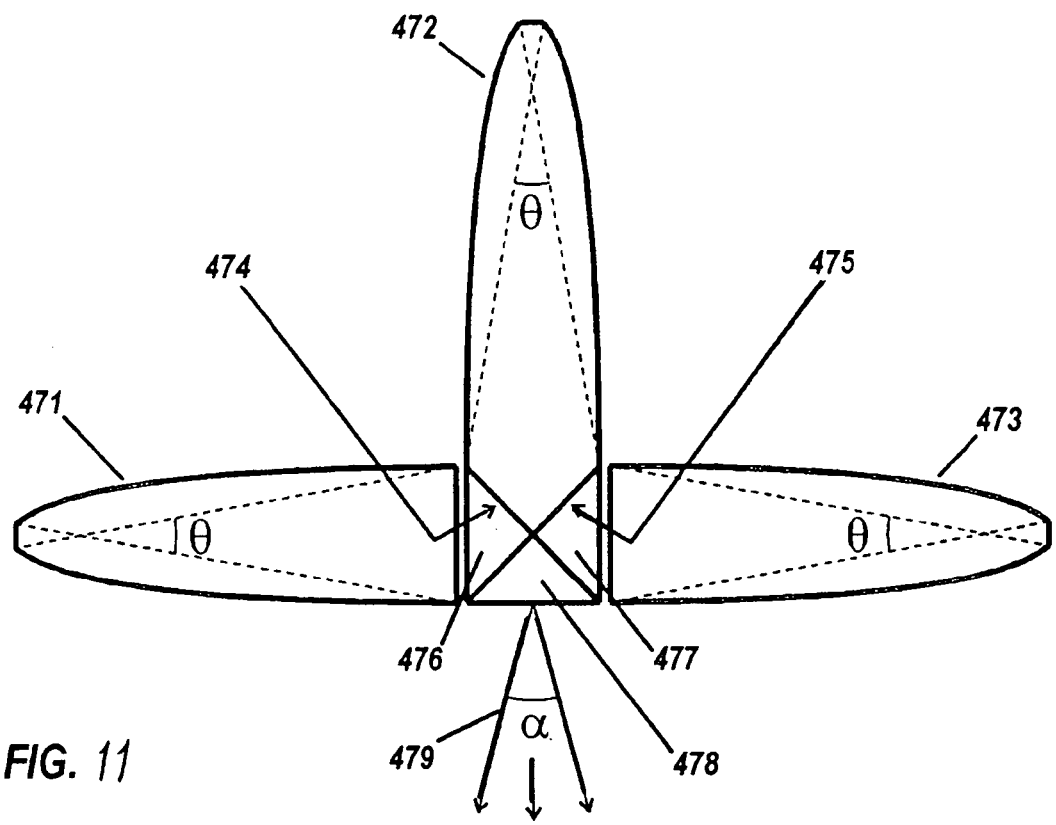
FIG. 11 is a cross-sectional view of an alternate configuration to provide a multiwavelength output that includes an orthogonal prism combiner with angularly narrow output.

FIG. 11 is a cross-sectional view of an alternative configuration of an optical manifold that resembles FIG. 10. When a white resultant is desired with a narrow angle, the fourth CPC can be dispensed with. Also, an air gap, as shown in FIG. 10, is not strictly necessary between the prism block and the green CPC. FIG. 11 shows the result, with red dielectric CPC 471 and blue dielectric CPC 473 as before, but green CPC 472 has a dual-diagonal exit face. Red reflector 474 and blue reflector 475 are applied to the faces of diagonal sub-prisms 476, 477, and 478. The combined white output 479 has beamwidth $\alpha$ that is the Snellian resultant of internal angle $\theta$ of the three CPCs.

Figure 12:
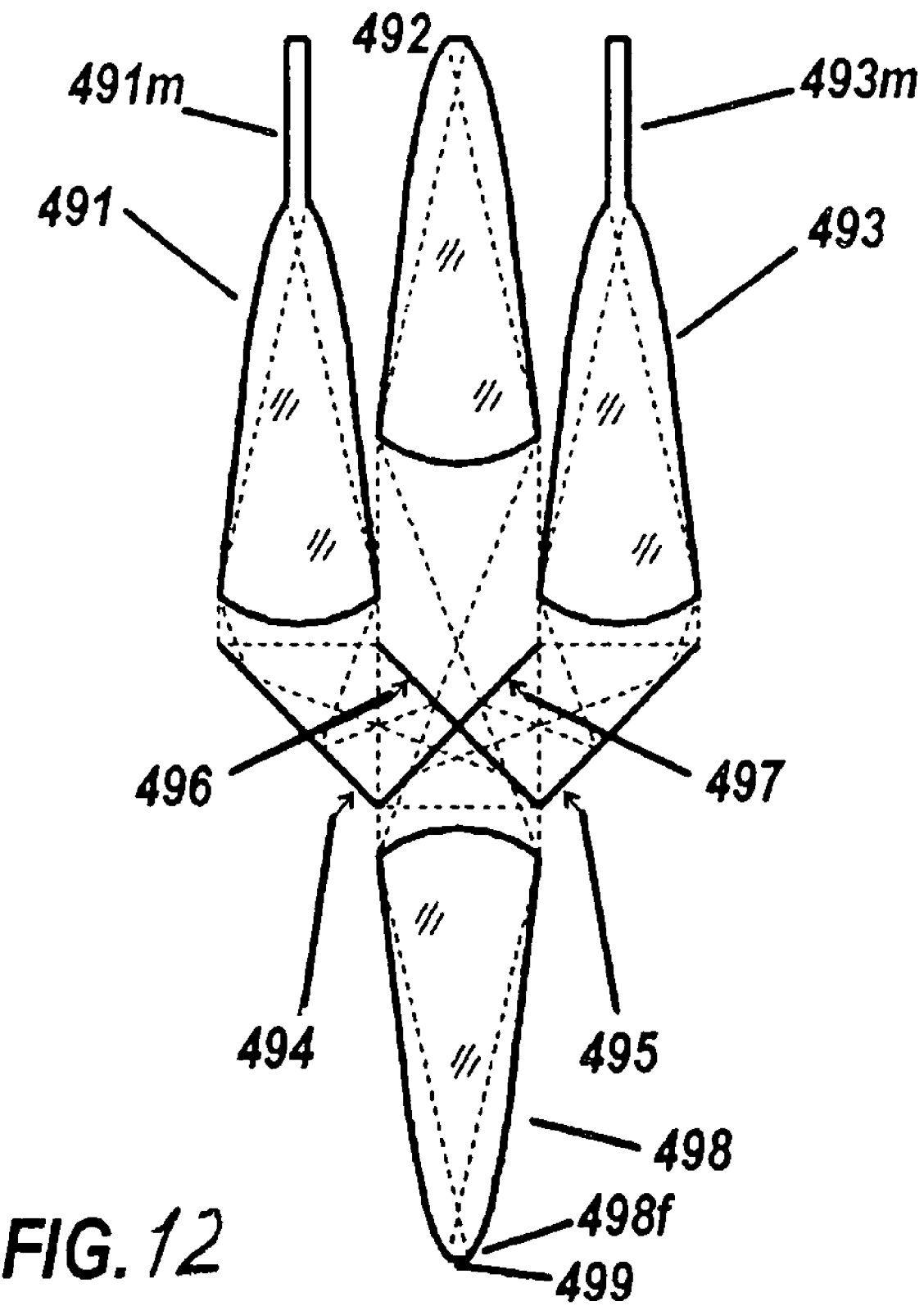
FIG. 12 is a cross-sectional view of an alternate configuration that includes a free-space parallel combiner with output area n times one input.

FIG. 12 is a cross-sectional view of an alternative configuration of an optical manifold that can be used to combine a plurality of different color LEDs to provide a multiwavelength light output. A free-space version of coplanar sources is also possible. FIG. 12 shows a red CPC 491 with mixing rod 491m, green curved-top CPC 492, and blue CPC 493 with configuration identical to CPC 491. Side CPCs 491 and 493 are designed to accept radiation confined to the critical angle defined by the direction of light coming out of the LEDs and refracted into the dielectric material of these CPCs. For the LEDs to be optically coupled to the optics (using glue or a gel), the upper tips of mixing rods 491m and 493m require small CPCs to transform the Lambertian radiation of the LEDs so that it is confined to the critical angle of the mixing rods and therefore the radiation can be transported down the mixing rods without side losses. In this case, side CPCs 491 and 493 are designed to accept the light confined to the critical angle, but middle CPC 492 is designed to accept the fully Lambertian radiation emitted by the central LED. A diagonal mirror 494 deflects red light onto red reflector 496, while mirror 495 deflects blue light onto blue reflector 497. Fourth CPC 498 combines these beams into a white output at exit face 499, with flat section 498f restricting incidence angles at 499 to critical angle $\alpha_c$. In the configuration shown in FIG. 12, the optical path lengths from the CPCs 491, 492, 493 to the exit CPC 498 can be made equal, and the three LEDs (at the tops of the mixing rods 491*m*, 493*m* and at the top of the CPC 492, as shown in FIG. 12, can be made coplanar, but the presence of mixing rods in two of the three paths may introduce some undesired inequality in the optical properties of the three paths.

Figure 13:
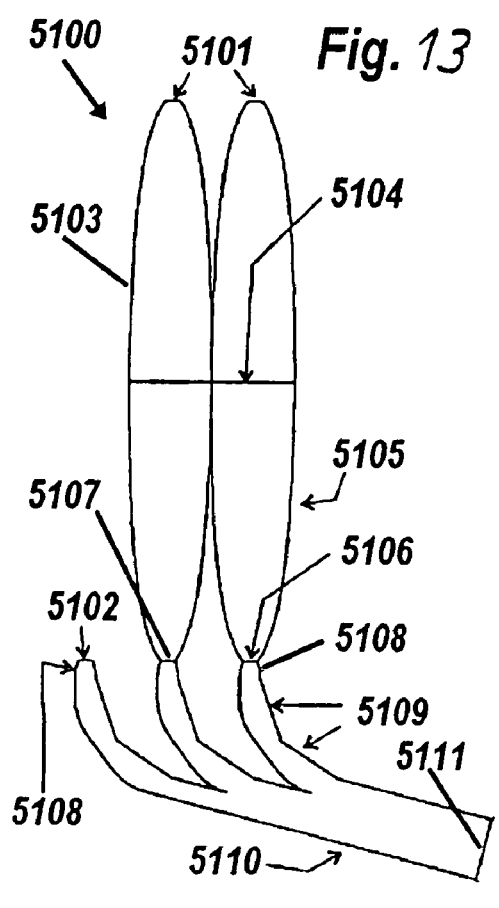
FIG. 13 is a cross-sectional view of a manifold that produces a multiwavelength output using different color LEDs, and a phosphor-coated surface.

FIG. 13 shows a device 5100 with two blue LEDs 5101, one shining through a yellow phosphor 5107 and the other shining through a green phosphor 5106, and a red LED 5102 bypassing the phosphors. A blue-pass filter 5104 at the broadest point between collimating CPCs 5103 and concentrating CPCs 5105 recycles back-emitted light from the phosphors. As shown in FIG. 51B, the device 5100 uses exit light guides 5109, 5110 to an exit port 5111. The skilled reader will see how the optical path lengths of the light guides 5109, 5110 can be made equal, at the expense of the red LED 5102 being in a different plane from the blue LEDs 5101.

Figure 14:
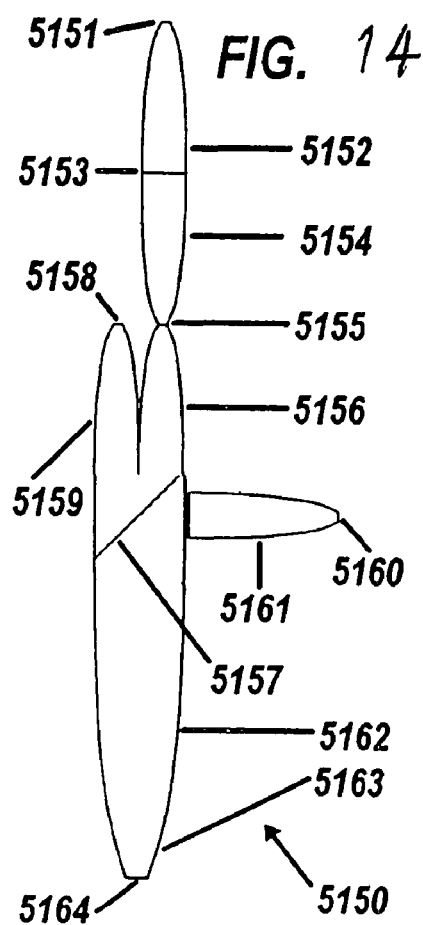
FIG. 14 is a cross-sectional view of an alternate configuration of a manifold that produces a multiwavelength output using different color LEDs, and a phosphor-coated surface.

FIG. 14 shows a device 5150 with two blue LEDs, one 5151 shining through a green phosphor 5155 and the other 5158 bypassing the phosphor, and a red LED 5160 bypassing the phosphor. Provided the phosphor 5155 substantially completely converts light from the blue LED 5151 to green light, the optical properties of CPCs 5152, 5154 that feed blue light through a blue-pass filter 5153 from the LED 5151 do not affect the optical properties of the emitted light. Green, blue, and red CPCs 5156, 5159, 5161 can then be matched, and by suitable positioning of red-reflecting short-pass mirror 5157 the effective optical path lengths from the green, blue, and red sources 5155, 5158, 5160 through CPC concentrator 5162 with tip 5163 to exit port 5164 can be made substantially equal. However, this design has the three LEDs 5151, 5158, 5160 in different planes, and not very conveniently positioned for practical use.

Various modifications and variations can be made in the present invention without departing from the spirit or scope of the invention. Thus, it is intended that the present invention cover the modifications and variations of this invention provided they come within the scope of the appended claims and their equivalents.

For example, although specific embodiments of optical devices have been described, the skilled person will understand how features from different embodiments may be combined, and it is intended that the present invention cover such combinations.

What is claimed is:

1. An optical manifold comprising:
   at least three collimators of substantially equal length and having central axes;
   respective light sources at entry ports of the collimators; and
   a component arranged to superimpose light from said light sources into a common light output, wherein the mean optical path lengths for said light from the exit ports of the respective collimators to the common light output are substantially equal;
   wherein the at least three collimators are arranged with their central axes parallel and with their light sources in a common plane; and
   the manifold further comprising reflectors positioned between the exit ports of the collimators and the component arranged to superimpose the light to direct light from the exit ports of the collimators to the component arranged to superimpose the light.

2. The optical manifold according to claim 1, wherein the reflectors are prisms.

3. The optical manifold according to claim 1, wherein the light sources are not all of the same color, and the component arranged to superimpose the light comprises at least one frequency-selective mirror.

4. The optical manifold according to claim 1, wherein the light sources comprise at least one LED and at least one phosphor, further comprising an LED arranged to excite the phosphor.

5. The optical manifold according to claim 1, wherein the at least three collimators include first and second collimators, each arranged to receive light from a source and transmit the light to an exit port of the respective collimator; and
   a separator arranged to emit some of the light from the exit ports of the first and second collimators and to recycle some of the light into the collimators.

6. The optical manifold according to claim 5, wherein the separator comprises reflectors covering only parts of the exit ports of the first and second collimators.

7. The optical manifold according to claim 6, wherein the first and second collimators are arranged with their exit ports side by side, and wherein the parts of the exit ports covered by the reflectors are non-adjacent parts.

8. An optical manifold comprising:
   at least three collimators of equal length and having central axes;
   respective light sources at entry ports of the collimators; and
   a component arranged to superimpose light from said light sources into a common light output, wherein the mean optical path lengths for said light from the exit ports of the respective collimators to the common light output are equal;
   wherein the at least three collimators are arranged with their central axes parallel and with their light sources in a common plane; and
   the manifold further comprising reflectors positioned between the exit ports of the collimators and the component arranged to superimpose the light to direct light from exit ports of the collimators to the component arranged to superimpose the light.

9. The optical manifold according to claim 8, wherein the reflectors are prisms.

10. The optical manifold according to claim 8, wherein the light sources are not all of the same color, and the component arranged to superimpose the light comprises at least one frequency-selective mirror.

11. The optical manifold according to claim 8, wherein the light sources comprise at least one LED and at least one phosphor, further comprising an LED arranged to excite the phosphor.

12. The optical manifold according to claim 8, wherein the at least three collimators include first and second collimators, each arranged to receive light from a source and transmit the light to an exit port of the respective collimator; and
    a separator arranged to emit some of the light from the exit ports of the first and second collimators and to recycle some of the light into the collimators.

13. The optical manifold according to claim 12, wherein the separator comprises reflectors covering only parts of the exit ports of the first and second collimators.

14. The optical manifold according to claim 13, wherein the first and second collimators are arranged with their exit ports side by side, and wherein the parts of the exit ports covered by the reflectors are non-adjacent parts.

* * * * *